form of cyclic imide groups, but also in the form of carboxylic acid amide groups. This modification of the polyesterimide resins known per se leads to important improvements in properties, especially with regard to insulation applications on electric conductors. Thus, the resins of the prior patent application are suitable for use in the production of wire lacquers, which, when applied to copper wires, form films of high long-term thermal stability and good thermal overload resistance.

United States Patent Office 3,562,219
Patented Feb. 9, 1971

3,562,219
PROCESS FOR THE PREPARATION OF A POLYESTERIMIDE RESIN
Karl Schmidt, Hofweg 45, Hamburg, Germany, and Dietrich Wille, Minsbekweg 20, Hamburg-Poppenbuttel, Germany
No Drawing. Filed Oct. 5, 1966, Ser. No. 584,329
Claims priority, application Germany, Oct. 9, 1965, B 84,039
Int. Cl. G08g 20/30, 41/00
U.S. Cl. 260—76
11 Claims

ABSTRACT OF THE DISCLOSURE

A process for the preparation of a polyesterimide resin comprising the steps of reacting at least one polybasic carboxylic acid or a reactive derivative thereof with at least one polyhydric alcohol and at least one primary amine or reactive derivative thereof to form a polycondensation product containing, in addition to ester groups, at least one five-membered imide ring. The number of primary amino groups employed is in excess of the primary amino groups bound in the cyclic imide group or groups, and/or at least one polyfunctional compound containing secondary amino groups is present in the reaction mixture. The process is characterized in that the reaction between the resin-forming components is carried out in the presence of at least 0.3% by weight of at least one conventional esterification catalyst, calculated on the weight of the resin produced.

This invention relates to processes for preparing polyesterimide resins.

Our co-pending application Ser. No. 448,829 filed Apr. 16, 1965, replaced by Ser. No. 706,191, filed Feb. 16, 1968, now U.S. Pat. No. 3,458,480, describes and claims a process for preparing a polyesterimide resin which comprises the steps of reacting at least one polybasic carboxylic acid or reactive derivative thereof with at least one polyhydric alcohol and at least one primary amine or reactive derivative thereof, optionally with the concurrent use of one or more aminocarboxylic acids and/or aminoalcohols and/or hydroxycarboxylic acids, to form a polycondensation product which contains, in addition to ester groups, at least one five-membered imide ring, the number of primary amino groups employed being in excess of the primary amino groups bound in the cyclic imide group or groups, and/or at least one polyfunctional compound containing secondary amino groups being present in the reaction mixture. The number of amino groups present preferably corresponds to at most 90%, preferably to 70%, of the sum of the number of cyclic dicarboxylic anhydride groups of their reactive derivatives and of the number of additional isolated carboxyl groups or their reacting derivatives.

More particularly, prior application Ser. No. 448,829 discloses a process for the preparation of a carboxylamide-containing polyesterimide resin which comprises the steps of reacting at least one acid component which contains (a) an imide-forming functional group which is a five-membered cyclic anhydride or two carboxyl groups bound to adjacent carbon atoms, or their esters, half esters, or half amides (b) at least one further functional group which is a carboxyl, carboxylic acid anhydride, carboxylic ester, or hydroxyl group, with at least one polyhydric alcohol and at least one amine component which contains a primary amino group and at least one other functional group which is a carboxyl, hydroxyl, or primary or secondary amino group, to form a polycondensation product containing, in addition to ester and amide groups, at least one five-membered imide ring, wherein the number of primary amino groups employed is in excess of the primary amino groups bound in the cyclic imide groups or at least one polyfunctional compound containing secondary and amino groups is present in the reaction mixture.

In the process of this prior application, the nitrogen is combined in the polycondensation product, not only in the form of cyclic imide groups, but also in the form of carboxylic acid amide groups. This modification of the polyesterimide resins known per se leads to important improvements in properties, especially with regard to insulation applications on electric conductors. Thus, the resins of the prior patent application are suitable for use in the production of wire lacquers, which, when applied to copper wires, form films of high long-term thermal stability and good thermal overload resistance.

The overload resistance of the lacquer films increases with increasing amide group content of the polyesterimide resins employed, so that, from this point of view, an amide group content which is as high as possible would appear to be desirable. However, further investigations have shown, that, as the amide group content increases, other disadvantages may appear; in particular, the elasticity of the lacquer film diminishes, so that films made from amide group-containing polyesterimide resins having particularly good thermal overload resistance may also display reduced elasticities. Further, when such lacquers are employed, the practically possible take-off rate of the lacquered wire, i.e. the quantity of insulated wire produced per unit of time, may be unfavourably affected.

It has now surprisingly been found that these disadvantages of the lacquers described in application Ser. No. 448,829 can be eliminated or at least reduced in a very simple manner by effecting the preparation of the amide group-containing polyesterimide resins in the presence of a minimum amount of esterification catalyst.

The invention, therefore, consists in effecting the reaction of the resin-forming components in the process described in application Ser. No. 448,829 in the presence of at least 0.3% by weight, preferably more than 0.5% by weight, of at least one conventional esterification catalyst, calculated on the resin produced.

As described in application Ser. No. 448,829, the reaction of the resin-forming components can take place in the presence of catalysts known per se. However, the amounts employed in the examples of that application are limited and do not exceed 0.5% by weight. It was completely surprising that the unfavourable effects previously referred to arising from the introduction of increasing amounts of amide groups into the condensation resin could be simply eliminated by employing relatively greater amounts of esterification catalysts. No explanation for this phenomenon is known. The fact is, however, that the wire lacquers and lacquer films prepared according to the present invention display a higher elasticity when deposited on wires and allow a higher take-off rate.

The upper limit of catalyst addition is determined by the value at which a clear resin can still be produced. An addition of 0.5 to 1.5% by weight, calculated on the resin formed, was found to be especially advantageous. The esterification catalysts employed are known compounds, such as butyl titanate, or the oxides, carbonates and salts of organic acids, such as the acetates, oxalates, naphthenates and octoates of metals, especially of zinc, tin, cerium and antimony. Thus, as a rule, these are organometallic compounds, either in the form of salts of organic acids or in the form of true organometallic compounds. Numerous esterification catalysts of this nature have been developed and described in the relevant literature.

As regards the other conditions, especially the starting materials for the resin-forming reaction and the conditions of resin formation, the directions given in application No. 448,829 retain their full validity in the present application. Accordingly, particularly important acid components are pyromellitic anhydride and trimellitic anhydride and their derivatives. As examples of amino-components with primary amino groups, there may be mentioned di- and polyvalent primary amines such as ethylenediamine, hexamethylenediamine, 4,4'-dicyclohexanediamine and, preferably, aromatic diamines, such as benzidine, diaminodiphenylmethane, diaminodiphenylketone, diaminodiphenylsulphone, diaminodiphenyl ether and thioether, phenylenediamines, toluylenediamines, as well as diamines with more than two benzene rings in the molecule, such as bis-(4-aminophenoxy)-1,4-benzene, or bis-(4-aminophenoxy)-4,4'-phenylpropane-2,2 and condensation products prepared under acid reaction conditions from aromatic monoamines, such as aniline, or diprimary diamines, and a carbonyl compound, especially formaldehyde. Mention may also be made of aminoalcohols, such as monoethanolamine, monopropanolamine, or dimethylethanolamine, and of aminocarboxylic acids, e.g. glycine, aminopropionic acid, aminocaproic acids or aminobenzoic acids. Minor amounts of amine components containing secondary amino groups can also be used, e.g., piperazine, N,N'-dimethylphenylenediamine and diethylenetriamine. Di- and higher-functional aromatic amines are preferred as amine components with primary and/or secondary amino groups. The preparation of the polyesterimide resins can be carried out in the most diverse ways. Information regarding their preparation is contained in our previous patent application Ser. No. 238,315, filed Nov. 2, 1962 and replaced by 659,234, filed Aug. 8, 1967.

Polycondensation products which are hardenable, in particular thermally hardenable, i.e. which contain additional reactive functional groups, are also of importance in the present invention. The directions of application No. 448,829 apply here as well.

In a particular way of carrying out the invention, it may be preferable to operate in the presence of an excess of one or more low-molecular weight, volatile glycols, as described for example, in our copending application No. 458,746 filed May 25, 1945, relaced by Ser. No. 706,187, filed Feb. 16, 1968. The excess glycol can be partly removed after resin condensation. It is preferable if at least 2 mols of glycol are used for every ester group of the poly-condensation product. The operation can be carried out by reacting the components required for polycondensate formation in solution or suspension in the glycol. The most important glycols in this respect are those with a small number of carbon atoms, such as propanediol-1,2 or -1,3, butylene glycol and/or diethylene glycol, but especially ethylene glycol.

The invention is illustrated by the following examples:

EXAMPLE 1

217 g. of glycol, 20 g. of pentaerythrol and 108 g. of terephthalic acid are esterified with 10 g. of antimony trioxide at 180° C. in a three-neck flask equipped with stirrer, reflux condenser and contact thermometer. A mixture of 237 g. of 4,4'-diaminodiphenylmethane and 192 g. of trimellitic anhydride is introduced in two portions at 140° C. and the temperature is raised in each case to 180° C. until a clear solution results. The temperature is then further raised to 220° C. and maintained at this level for 2 hours, following which the mixture is subjected to vacuum distillation. 180 g. of total distillate were obtained in this manner.

The resin thus obtained was diluted with 680 g. of technical grade cresol and 180 g. of xylene, and was deposited on a copper wire of 1 mm. diameter in a horizontal wire-enamelling oven.

Technical data: Oven length 3.80 m.; oven temperature 480° C.; applicator device; roll and felt, 6 passes; take-off speed: 6.8 metres/minute; thickness of lacquer layer (increase of wire diameter): 0.05 mm.

The testing of the lacquer insulation yielded the following values: pencil hardness 3H; at 36% elongation (copper break) the lacquer film showed no fissures and no tendency to chip off. Softening temperature according to German Standard Specification DIN 46 453/12, with a steel needle under 1000 g. loading and of 1 mm. diameter: 354° C.

Overload test: over 600 minutes.

A wire spiral made of a 25% pre-stretched wire under 0.5 kg./cm.$^2$ load about the wire diameter showed a faultless lacquer film. The lacquer film broke after a torsion of 110 turns with a 27 cm. wire length.

EXAMPLE 2

A resin was prepared as in Example 1 from 310 g. of glycol, 4.5 g. of glycerin, 6.8 g. of pentaerythrol, 108 g. of terephthalic acid, 11 g. of tin oxalate, 192 g. of trimellitic acid, 277.0 g. of 4,4'-diaminodiphenylmethane, which resin was dissolved in 1200 g. of technical grade cresol and 300 g. of xylene. The lacquer film was produced as in Example 1.

Properties:
    Pencil hardness: 3 H
    Softening temperature: 348° C.
    Overload test: 872 minutes
    Wire spiral: 1φ faultless
    Torsion: 118

EXAMPLE 3

Compositions: 320 g. of glycol, 162 g. of terephthalic acid, 30 g. of pentaerythritol, 5 g. of antimony trioxide, 6 g. of butyl titanate, 288.0 g. of trimellitic anhydride, 223.0 g. of 4,4'-diaminodiphenylmethane. The resin and lacquer film were prepared as in Example 1.

The properties of the resulting lacquer film were as follows:

Pencil hardness: 3 H
Softening temperature: 348° C.
Overload test: 622 minutes
Wire spiral: 1φ faultless
Torsion: 122

EXAMPLE 4

The following is a tabulation of comparative experiments, in which increasing amounts of catalyst were used while keeping the other operating conditions constant. A comparison of the torsional values of the finished lacquer shows that the elasticity of the film improves with increasing amounts of catalyst.

The following components were reacted with each other in three different charges:

|  | Parts by weight |
|---|---|
| Glycol | 310 |
| Pentaerythritol | 30 |
| Terephthalic acid | 108 |
| Trimellitic anhydride | 192 |
| 4,4'-diaminodiphenylmethane | 277 |
| Total quantity | 917 |
| Distillate | 210 |
| Resin | 707 |

The amounts of catalyst used in the three comparative experiments are shown in the following table, together with the torsional values measured on the finished wire lacquer. The lacquer was applied in all cases at 480° C., a take-off speed of 5.0 metres/min., and an oven length of 3.5 metres:

|  | 1 | 2 | 3 |
|---|---|---|---|
| Catalyst addition ($Sb_2O_3$)[1] | 1.8 | 4.5 | 10.0 |
| Catalyst in percent of resin [1] | 0.25 | 0.63 | 1.41 |
| Torsion (No. of twists for 27 cm. wire length) | 80 | 91 | 122 |

[1] Parts by weight.

EXAMPLE 5

83 g. of terephthalic acid were esterified with 62 g. of glycol and 17 g. of pentaerythritol in 400 g. of cresol, at 190–200° C., in the presence of 7.5 g. of antimony trioxide. At 120° C., a mixture consisting of 192 g. of trimellitic anhydride, and 198 g. of 4,4′-diaminodiphenyl ether were added thereto in two portions, and the temperature was raised to 180° C. Following this, the temperature was raised to 210° C. for 2 hours. The mixture was then diluted with 400 g. of cresol and 300 g. of solvent naphtha, and the application was carried out as in the previous examples. The lacquer film produced had properties comparable with those of the previous examples.

EXAMPLE 6

140 g. of terephthalic acid were esterified with 112 g. of glycol, 14 g. of pentaerythritol and 430 g. of cresol, using 10 g. of tin oxalate, at 180–200° C. To this solution, there was added a mixture consisting of 198 g. of 4,4′-diaminodiphenylmethane and 192 g. of trimellitic anhydride in two portions at 120° C. The temperature was then in each case raised to 180° C. until a clear solution formed. Following this, the temperature was rasied to 210° C. for 2 hours. The lacquer thus obtained was diluted with cresol and solvent naphtha and applied as in the previous examples. The lacquer film produced had properties comparable with those of previous examples.

What we claim as our invention and desire to secure by Letters Patent of the United States is:

1. In a process for the preparation of a carboxylamide-containing polyesterimide resin which comprises the steps of reacting at least one acid component which contains (a) an imide-forming functional group which is a five-membered cyclic anhydride or two carboxyl groups bound to adjacent carbon atoms, or their esters, half esters, or half amides (b) at least one further functional group which is carboxyl, carboxylic acid anhydride, carboxylic ester, or hydroxyl group, with at least one polyhydric alcohol and at least one amide component which contains a primary amino group and at least one other functional group which is a carboxyl, hydroxyl, or primary or secondary amino group, to form a polycondensation product containing, in addition to ester and amide groups at least one five-membered imide ring, wherein the number of primary amino groups employed is in excess of the primary amino groups bound in the cyclic imide groups or at least one polyfunctional compound containing secondary amino groups is present in the reaction mixture, the improvement which comprises carrying out the reaction in the presence of at least 0.3% by weight of at least one conventional esterification catalyst, calculated on the weight of the resin produced.

2. A process as claimed in claim 1 wherein the amount of said esterification catalyst or catalysts is more than 0.5% by weight.

3. A process as claimed in claim 2 wherein the reaction mixture also includes one or more substances selected from the group consisting of amino-carboxylic acids, amino-alcohols and hydroxycarboxylic acids.

4. A process according to claim 2, wherein the total amount of amino-compounds employed is such that the total number of amino groups does not exceed 90% of the sum of the number of cyclic dicarboxylic acid anhydride groups, or of combinations of reactive groups equivalent thereto, and the number of additional isolated carboxyl groups or their reactive derivatives capable of amide formation.

5. A process as claimed in claim 2 wherein the total number of amino groups does not exceed 70% of the sum of the number of cyclic dicarboxylic acid anhydride groups, or of combinations of reactive groups equivalent thereto, and the number of additional isolated carboxyl groups or their reactive derivatives capable of amide formation.

6. A process as claimed in claim 2, wherein said primary amine, and said polyfunctional compound containing secondary amine groups where such a compound is employed, are aromatic di- or polyamines.

7. A process according to claim 1, wherein the total amount of amino-compounds employed is such that the total number of amino groups does not exceed 90% of the sum of the number of cyclic dicarboxylic acid anhydride groups, or of combinations of reactive groups equivalent thereto, and the number of additional isolated carboxyl groups or their reactive derivatives capable of amide formation.

8. A process as claimed in claim 7 wherein the total number of amino groups does not exceed 70% of the sum of the number of cyclic dicarboxylic acid anhydride groups, or of combinations of reactive groups equivalent thereto, and the number of additional isolated carboxyl groups or their reactive derivatives capable of amide formation.

9. A process as claimed in claim 1 wherein said primary amine, and said polyfunctional compound containing secondary amine groups where such a compound is employed, are aromatic di- or polyamines.

10. Process according to claim 1, wherein the total amount of amino-compounds employed is such that the total number of amino groups does not exceed 90% of the sum of the number of cyclic dicarboxylic acid anhydride groups, or the combinations of reactive groups equivalent thereto, and the number of additional isolated carboxyl groups or their reactive derivatives capable of amide formation, wherein said primary amine, and said polyfunctional compound containing secondary amine groups where such a compound is employed, are aromatic di- or polyamines, and wherein the polycondensation product produced is a hardenable, thermosetting resin.

11. A polyesterimide resin produced by the process of claim 1.

References Cited

UNITED STATES PATENTS

| | | | |
|---|---|---|---|
| 3,274,159 | 9/1966 | Kluiber | 260—75 |
| 3,306,771 | 2/1967 | Schmidt et al. | 117—218 |
| 3,377,321 | 4/1968 | Van Strien et al. | 260—75 |
| 3,382,203 | 5/1968 | Rating et al. | 260—33.4 |

FOREIGN PATENTS 973,377   10/1964   Great Britain _____ 260—75N

HAROLD D. ANDERSON, Primary Examiner

M. GOLDSTEIN, Assistant Examiner

U.S. Cl. X.R.

117—128.4; 260—33.4, 33.6, 47, 75, 77